US012623290B2

(12) United States Patent     (10) Patent No.:   US 12,623,290 B2

Murray et al.     (45) Date of Patent:    May 12, 2026

(54) ADDITIVE MANUFACTURING SYSTEM WITH PARTIALLY FLEXIBLE BUILD PLATFORM

(71) Applicant: General Electric Company, Schenectady, NY (US)

(72) Inventors: James J. Murray, Mauldin, SC (US); Archie Lee Swanner, Jr., Easley, SC (US); Evan John Dozier, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 350 days.

(21) Appl. No.: 17/376,291

(22) Filed: Jul. 15, 2021

(65) Prior Publication Data

US 2023/0013204 A1     Jan. 19, 2023

(51) Int. Cl.
    *B22F 12/30*       (2021.01)
    *B22F 10/28*       (2021.01)
    *B33Y 30/00*       (2015.01)

(52) U.S. Cl.
    CPC ............... *B22F 12/30* (2021.01); *B33Y 30/00* (2014.12); *B22F 10/28* (2021.01)

(58) Field of Classification Search
    CPC .......... B22F 10/30; B22F 10/20; B22F 10/28; B22F 12/00; B22F 12/30; B22F 10/00;

(Continued)

(56) References Cited

U.S. PATENT DOCUMENTS 5,979,944 A * 11/1999 Yokoyama .......... F15B 13/0817
                                    285/124.3
9,597,731 B2 * 3/2017 Volk ...................... B33Y 30/00

(Continued)

FOREIGN PATENT DOCUMENTS

CN     111660555 A     9/2020
EP     3417961 B1     12/2018

(Continued)

OTHER PUBLICATIONS

Espacenet machine translation of Abe et al., JP 2013163829 A, originally published 2013 (Year: 2013).*

(Continued)

*Primary Examiner* — Susan D Leong
*Assistant Examiner* — Jennifer L Groux
(74) *Attorney, Agent, or Firm* — James Pemrick; Charlotte Wilson; Hoffman Warnick LLC

(57) ABSTRACT

An additive manufacturing (AM) system includes a build chamber, a base adjustably coupled to the build chamber, and a build material applicator for depositing a build material above a build platform for creating the object. The build platform includes a fixed region fixedly and rigidly coupled to the base and a flex region configured to flex relative to the base in response to a force applied to the build platform by an object. The partial flexibility allows deformation caused by thermal distortion of the build platform during use to reduce final object stress. The AM system can produce larger additively manufactured objects out of crack-prone material. In addition, the partial flexibility may prevent damage to the build platform and/or base without an overly complicated arrangement.

18 Claims, 7 Drawing Sheets

(58) Field of Classification Search

CPC .. B22F 3/24; B22F 10/25; B22F 12/90; B22F 2003/248; B29C 64/245; B29C 64/147; B29C 64/153; B29C 64/165; B29C 70/54; B29C 65/7841; B29C 64/20; C08J 5/18; G02F 1/133305; B33Y 10/00; B33Y 30/00; B24B 41/06; B24B 41/02; B23K 37/00; B23K 26/702; B23K 37/0443; B23K 37/0435; B23K 37/04; B23K 37/0426; B23K 37/0408; B23K 3/08; B23K 20/26; B23K 26/342; B23K 26/70; B23K 37/0461; B23K 11/36; G03F 7/70716; F16M 11/18; F16M 13/02; F16M 11/04; F16M 11/10; B25B 11/00; B25B 11/02; B25J 11/00; B25J 9/0009; B25J 9/0015; B25J 19/00; B23Q 3/06; B23Q 7/00; B23Q 3/062; B23Q 3/00; B23Q 1/25; B05B 13/0285; F16B 5/0258

See application file for complete search history.

(56) References Cited

U.S. PATENT DOCUMENTS

| | | | |
|---|---|---|---|
| 10,682,702 B2 | 6/2020 | Haro Gonzalez et al. | |
| 2010/0034983 A1* | 2/2010 | Fuwa | B22F 10/28 427/557 |
| 2011/0293770 A1* | 12/2011 | Ackelid | B29C 64/205 425/174.4 |
| 2013/0327917 A1* | 12/2013 | Steiner | G06F 3/1224 248/649 |
| 2014/0110936 A1* | 4/2014 | Shinohara | F16B 5/0258 411/371.1 |
| 2016/0108483 A1 | 4/2016 | Meyer et al. | |
| 2016/0144535 A1* | 5/2016 | Touma | B29C 64/118 425/375 |
| 2016/0169821 A1* | 6/2016 | Meyer | B22F 12/30 425/136 |
| 2016/0332387 A1* | 11/2016 | Jondal | B29C 64/40 |
| 2019/0054531 A1* | 2/2019 | Corsmeier | B22F 10/20 |
| 2019/0308242 A1 | 10/2019 | Matsumoto | |
| 2019/0381751 A1* | 12/2019 | Matlack | B29C 70/342 |
| 2020/0238616 A1 | 7/2020 | Pfister et al. | |
| 2021/0053286 A1* | 2/2021 | Yudovsky | B22F 10/28 |
| 2021/0154732 A1 | 5/2021 | Almeida | |
| 2021/0402480 A1* | 12/2021 | Sweetland | B22F 12/30 |
| 2022/0118700 A1* | 4/2022 | Hunt | B29C 64/232 |
| 2024/0316640 A1 | 9/2024 | Oster et al. | |

FOREIGN PATENT DOCUMENTS

| | | |
|---|---|---|
| EP | 3720687 | 6/2019 |
| JP | 2012224906 A * | 11/2012 |
| JP | 2013163829 A * | 8/2013 |
| WO | 2016/032891 A1 | 3/2016 |
| WO | 2019074827 A1 | 4/2019 |
| WO | 2019/112594 A1 | 6/2019 |
| WO | 2020/034991 A1 | 2/2020 |
| WO | 2020/132052 A1 | 6/2020 |

OTHER PUBLICATIONS

Extended European Search Report for EP Application No. 22181171.4 dated Nov. 14, 2022, 8 pages.

International Preliminary Report on Patentability in PCT/US2022/037274, mailed Jan. 25, 2024, 7 pages.

Office Action (Final Rejection) dated Nov. 26, 2025 for related U.S. Appl. No. 18/578,197, 6 pages.

Office Action (Non-Final Rejection) dated Jun. 11, 2025 for related U.S. App. No. 18/578,197, 24 pages.

* cited by examiner

ADDITIVE MANUFACTURING SYSTEM WITH PARTIALLY FLEXIBLE BUILD PLATFORM

TECHNICAL FIELD

The disclosure relates generally to additive manufacturing, and more particularly, to an additive manufacturing system having a partially flexible build platform.

BACKGROUND

Additive manufacturing (AM) includes a wide variety of processes of producing an object through the successive layering of material on a build platform rather than the removal of material from a block of material. With certain additive manufacturing processes, as the object is built, it can apply a stress to the build platform. For example, in a selective laser melting (SLM) AM process, large parts with large weld areas compared to the build platform area can cause the build platform to deform or warp due to thermal shrinkage. Where the build platform is fully rigidly constrained to the base of the AM system, the thermal stress can remain in the part, causing defects. Alternatively, the stress can damage the connection between the build platform and the base. One corrective approach adds compliant supports to the object that are allowed to deform, but the supports can be expensive and time consuming to build, and complicate the manufacture of the object. Other approaches implement complicated spring systems between the base and the build platform, allowing the entire build platform to flex. The spring systems can clog from material accumulation therein, and disadvantageously require independent movement of the base relative to the build platform.

BRIEF DESCRIPTION

All aspects, examples and features mentioned below can be combined in any technically possible way.

An aspect of the disclosure provides an additive manufacturing (AM) system, comprising: a build chamber; a base adjustably coupled to the build chamber; a build platform including a fixed region fixedly and rigidly coupled to the base and a flex region configured to flex relative to the base in response to a force applied to the build platform by an object; and a build material applicator for depositing a build material above the build platform for creating the object.

Another aspect of the disclosure includes any of the preceding aspects, and the build platform includes at least one fastener fixedly and rigidly coupling the fixed region to the base.

Another aspect of the disclosure includes any of the preceding aspects, and further comprising a flex limiter within the build platform, the flex limiter limiting a range of flexing of the flex region of the build platform relative to the base.

Another aspect of the disclosure includes any of the preceding aspects, and the flex limiter includes: an opening defined through the build platform, the opening including a seat therein; a member coupled to the base through the opening, the member including a mechanical stop spaced a distance from the seat in a non-flexed state of the build platform, wherein in response to the force applied to the build platform by the object, the flex region flexes relative to the base up to the distance at which the mechanical stop engages the seat to prevent further flexing.

Another aspect of the disclosure includes any of the preceding aspects, and the flex limiter further includes a compressible member between the mechanical stop of the member and the seat in the build platform.

Another aspect of the disclosure includes any of the preceding aspects, and the compressible member includes a compression spring.

Another aspect of the disclosure includes any of the preceding aspects, and the opening is defined only in a build surface of the build platform adjacent an area of the build surface upon which the object will be built, and further comprising a closure mounted in an upper end of the opening and enclosing the flex limiter.

Another aspect of the disclosure includes any of the preceding aspects, and the base directly contacts the build platform.

Another aspect of the disclosure includes any of the preceding aspects, and the flex region includes first opposing peripheral sides across an X axis of the build platform.

Another aspect of the disclosure includes any of the preceding aspects, and the flex region includes second opposing peripheral sides across a Y axis of the build platform.

Another aspect of the disclosure includes any of the preceding aspects, and the build material applicator deposits a layer of material, and further comprising a welding system for welding a portion of the layer of material to an underlying layer of the object.

Another aspect of the disclosure provides an additive manufacturing (AM) system, comprising: a build chamber; a base adjustably coupled to the build chamber; a build platform including a fixed region fixedly and rigidly coupled to the base by at least one fastener, and a flex region configured to flex relative to the base in response to a force applied to the build platform by an object; a flex limiter within the build platform, the flex limiter limiting a range of flexing of the flex region of the build platform relative to the base; and a build material applicator for depositing a build material above the build platform for creating the object.

Another aspect of the disclosure includes any of the preceding aspects, and the flex limiter includes: an opening defined through the build platform, the opening including a seat therein; a member coupled to the base through the opening, the member including a mechanical stop spaced a distance from the seat in a non-flexed state of the build platform, wherein in response to the force applied to the build platform by the object, the flex region flexes relative to the base up to the distance at which the mechanical stop engages the seat to prevent further flexing.

Another aspect of the disclosure includes any of the preceding aspects, and the flex limiter further includes a compressible member between the mechanical stop of the member and the seat in the build platform.

Another aspect of the disclosure includes any of the preceding aspects, and the compressible member includes a compression spring.

Another aspect of the disclosure includes any of the preceding aspects, and the opening is defined only in a build surface of the build platform adjacent an area of the build surface upon which the object will be built, and further comprising a closure mounted in an upper end of the opening.

Another aspect of the disclosure includes any of the preceding aspects, and the flex region includes first opposing peripheral sides across an X axis of the build platform.

Another aspect of the disclosure includes any of the preceding aspects, and the flex region includes second opposing peripheral sides across a Y axis of the build platform.

Another aspect of the disclosure includes any of the preceding aspects, and the build material applicator deposits a layer of material, and further comprising a welding system for welding a portion of the layer of material to an underlying layer of the object.

An aspect of the disclosure provides a method comprising: additively manufacturing an object by an additive manufacturing (AM) system including: a build chamber; a base adjustably coupled to the build chamber; a build platform including a fixed region fixedly and rigidly coupled to the base and a flex region configured to flex relative to the base in response to a force applied to the build platform by an object; and a build material applicator for depositing a build material above the build platform for creating the object.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
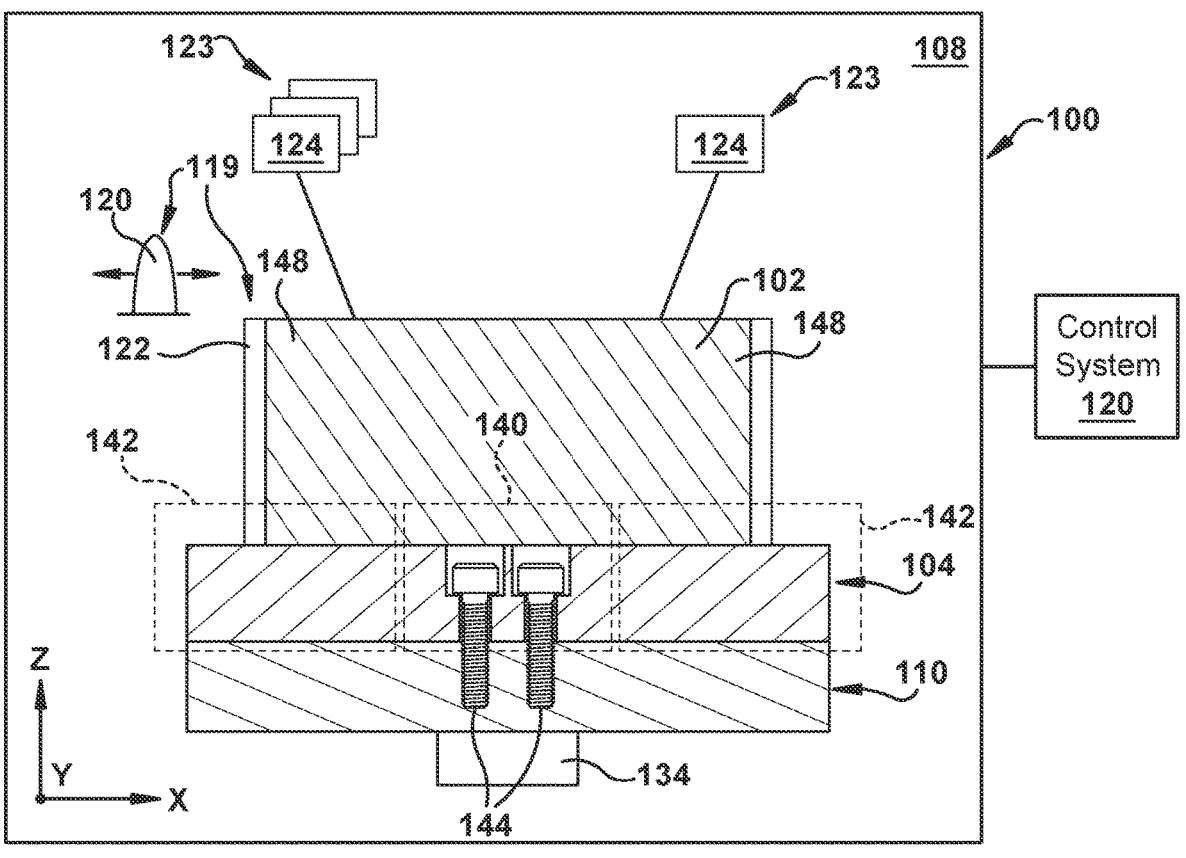
FIG. 1 shows a cross-sectional view of an additive manufacturing (AM) system including a partially flexible build platform in a non-flexed state, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine objects within an additive manufacturing system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular object may be referred to using several different or overlapping terms. What may be described herein as being a single part may include and be referenced in another context as consisting of multiple parts. Alternatively, what may be described herein as including multiple parts may be referred to elsewhere as a single part.

Several descriptive terms may be used regularly herein, as described below. The terms "first", "second", and "third" may be used interchangeably to distinguish one object from another and are not intended to signify location or importance of the individual objects.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or objects but do not preclude the presence or addition of one or more other features, integers, steps, operations, elements, objects, and/or groups thereof "Optional" or "optionally" means that the subsequently described event or circumstance may or may not occur or that the subsequently describe object or element may or may not be present, and that the description includes instances where the event occurs or the object is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an additive manufacturing (AM) system that includes a partially flexible build platform. More particularly, the AM system includes a build chamber, a base adjustably coupled to the build chamber, and a build material applicator for depositing a build material above a build platform for creating the object. The build platform includes a fixed region fixedly and rigidly coupled to the base, and a flex region configured to flex relative to the base in response to a force applied to the build platform by an object. That is, the flex region(s), e.g., one or more outer section(s), of the build platform are given flexibility to flex or curl up as the object(s) cool and "pull" on the build platform. The partial flexibility allows deformation caused by thermal distortion of the build platform during the print process to reduce final object stress. With a less restrictive build platform, stress can be reduced in at least the lower portion of the object, reducing risk of stress induced defects. The AM system can thus produce larger additively manufactured objects out of crack-prone material. In addition, the partial flexibility may prevent damage to the build platform and/or base without an overly complicated arrangement.

Embodiments of the disclosure can be applied to any type of additive manufacturing system. Additive manufacturing techniques typically include taking a three-dimensional computer aided design (CAD) file of the object to be formed, electronically slicing the object into layers, e.g., 18-102 micrometers thick, and creating a file with a two-dimensional image of each layer, including vectors, images or coordinates. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the object. In metal powder additive manufacturing techniques, such as direct metal laser melting (DMLM) (also referred to as selective laser melting (SLM)), metal powder layers are sequentially melted together to form the object. More specifically, fine metal powder layers are sequentially melted after being uniformly distributed using an applicator on a build platform in the form of metal powder bed.

Figure 2:
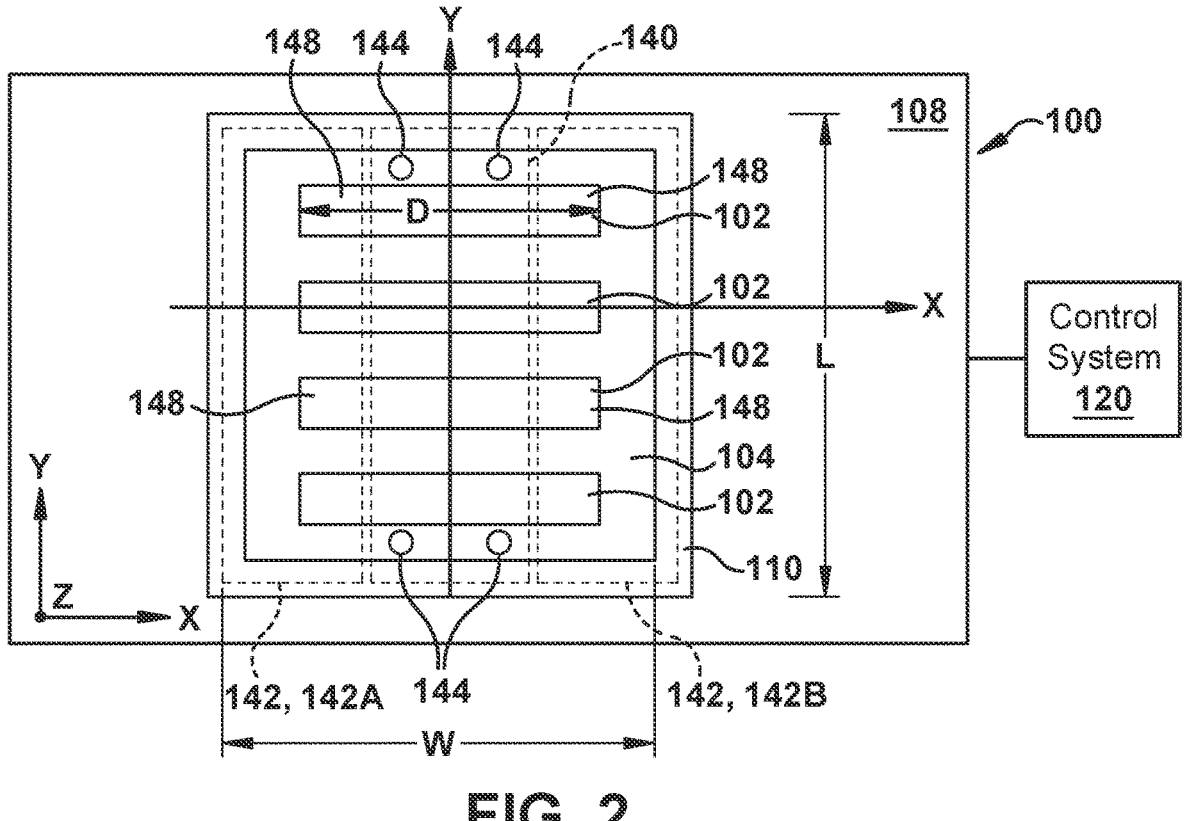
FIG. 2 shows a plan view of an AM system including a partially flexible build platform, according to embodiments of the disclosure.
Figure 3:
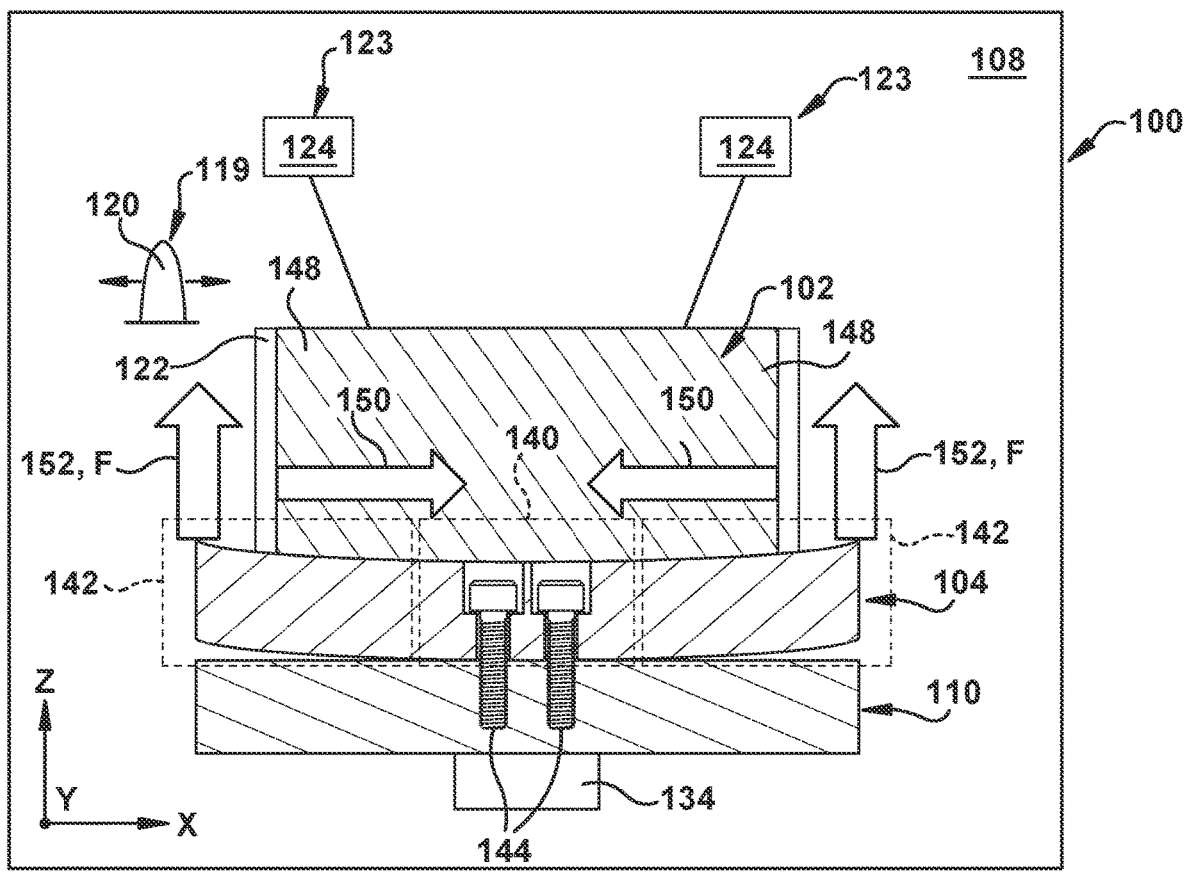
FIG. 3 shows a cross-sectional view of an AM system including a partially flexible build platform in a flexed state, according to embodiments of the disclosure.

FIGS. 1 and 3 show schematic cross-sectional views, and FIG. 2 shows a plan view of an additive manufacturing system 100 for building one or more objects 102. For purposes of description, an additive manufacturing system 100 (hereinafter 'AM system 100') in the form of computerized metal powder additive manufacturing system will be referenced.

With reference to FIGS. 1 and 2, AM system 100 is creating object(s) 102 on a build platform 104. AM system 100 can generate an object 102, which may include one large object or multiple objects 102 of which only a single layer is shown in FIG. 2. Object(s) 102 are illustrated as rectangular elements; however, it is understood that the additive manufacturing process can be readily adapted to manufacture any shaped object, a large variety of objects and a large number of objects on a build platform 104.

In any event, AM system 100 includes a build chamber 108 and a base 110 adjustably coupled to build chamber 108. Build chamber 108 is arranged such that a Y-direction and an X-direction are substantially coplanar with build platform 104 and base 110, and a Z-direction is substantially perpendicular to build platform 104 and base 110. Build chamber 108 provides a controlled atmosphere for object(s) 102 printing, e.g., a set pressure and temperature for lasers, or a vacuum for electron beam melting. AM system 100 may include a build material depositing system 119 for depositing build material 122 above build platform 104 for creating object(s) 102. Build material depositing system 119 may include any now known or later developed material delivery system. For the example of a DMLM system, system 119 may include a build material applicator 120 ("applicator 120") for depositing build material 122 above build platform 104 for creating object(s) 102. In metal powder applications, applicator 120 deposits a layer of material 122, i.e., over an underlying layer of object(s) 102. Applicator 120 delivers and smooths the new layers of metal powder build material 122 (FIG. 1). Once a layer is formed, a welding system 123 welds a portion of the layer of material 122. In the example AM system 100, welding system 123 includes high powered melting beam(s), such as a 100 Watt ytterbium laser(s) 124, which can melt or sinter a portion of the layer of build material 122, which later solidifies to form object(s) 102. Laser(s) 124 and/or build platform 104 moves in the X-Y direction. Once a layer of object(s) 102 has been formed, base 110 is lowered by a vertical adjustment system 134. Vertical adjustment system 134 may also vertically adjust a position of other parts of AM system 100 to accommodate the addition of each new layer. For example, a build platform 104 may lower and/or build chamber 108 and/or applicator 120 may rise after each layer is formed. Vertical adjustment system 134 may include any now known or later developed linear actuators to provide such adjustment that are under the control of an AM control system 200 (FIG. 9), described elsewhere herein. Once lowered, the process is then repeated, starting with applicator 120 directing a layer of build material 122 across the now-lower object(s) 102. Build platform 104 on base 110 may be lowered for each subsequent two dimensional layer, and the process repeats until object(s) 102 is completely formed.

During formation, thermal stress may be created in object(s) 102 during the build, which may be retained in object(s) 102 and/or applied to build platform 104. In accordance with embodiments of the disclosure, build platform 102 includes a fixed region 140 (dashed line box) fixedly and rigidly coupled to base 110, and a flex region 142 (dashed line box) configured to flex relative to base 110. FIG. 1 shows object 102 and build platform 104 before flexing, and FIG. 3 shows object 104 and build platform 104 after flexing. (Note, FIG. 3 shows an exaggerated flexing of build platform 104 for purposes of illustration). Build platform 104 may be coupled to base 110, for example, by at least one fastener 144 in fixed region 140, e.g., four fasteners 144 shown in FIG. 2. Hence, build platform 104 is always in direct contact with base 110, and cannot move entirely independently of base 110. In contrast, flex region 142 is free to move away from base 110, i.e., it is not fixedly coupled to base 110. Hence, flex region 142 of build platform 104 is configured to allow partial flexing of build platform 104 relative to base 110 in response to a force (F) applied to build platform 104 by object(s) 102. Build platform 104 may be made of any material and have any dimensions (e.g., thickness) to allow the desired flexing.

In use, as shown in FIGS. 1 and 3, object(s) 102 are built on build platform 104 using any additive manufacture process, e.g., DMLM as shown. Base 110 directly contacts build platform 104. As shown in FIG. 1, where object(s) 102 do not exert sufficient force on build platform 104 to flex, build platform 104 remains substantially coplanar with base 110. However, where object(s) 102 exert sufficient force (F) on build platform 104 to flex, build platform 104 flexes in flex regions(s) 142, and can come out of direct contact with base 110. However, fixed region 140 of build platform 104 remains in direct contact with base 110 retaining a substantially coplanar relationship with base 110.

The force necessary to cause the flexing and the location of the force can be customized to address any challenge, e.g., crack-prone objects 102, build platform-base connection breakage, etc. More particularly, the location, shape, size and/or number of fixed regions 140 and flex regions 142 can be adjusted to address build challenges, depending on a number of factors. For example, as shown in FIG. 2, an object 102 to be built may have a dimension (D) the size of which may require stress relief. Flex region(s) 142 may be configured to relieve that stress. In the example shown in FIGS. 2 and 3, flex region 142 is positioned under outer ends 148 of object 102 to provide stress relief. As shown in FIG. 3, stress 150 is relieved on object 102 by deflection 152 of build platform 104 in flex regions 142. In another example, the thickness or the material of build platform 104 may be selected to customize the force F required to cause flexing. Notably, each build platform 104 may be re-surfaced after use, which reduces a thickness of the build platform 104, and may require a widening or narrowing of fixed region(s) 140 and/or flex region(s) 142 to address stress in subsequent object(s) 102 builds. In another example, the material of object 102 and/or the material of build platform 104 may benefit from adjusting the location and/or extent of fixed region(s) 140 and/or flex region(s) 142. For example, where crack-prone material is being used for object 102, a larger flex region 142 or a larger number of flex regions 142 may be desirable. In the examples shown in FIG. 2, fixed region 140 extends an entire length (L) of build platform 104, and two lengthwise (L) flex regions 142 flank the fixed region 140. Here, flex region 142 includes first opposing peripheral sides 142A, 142B positioned across a Y axis of build platform 104.

Figures 4, 5:
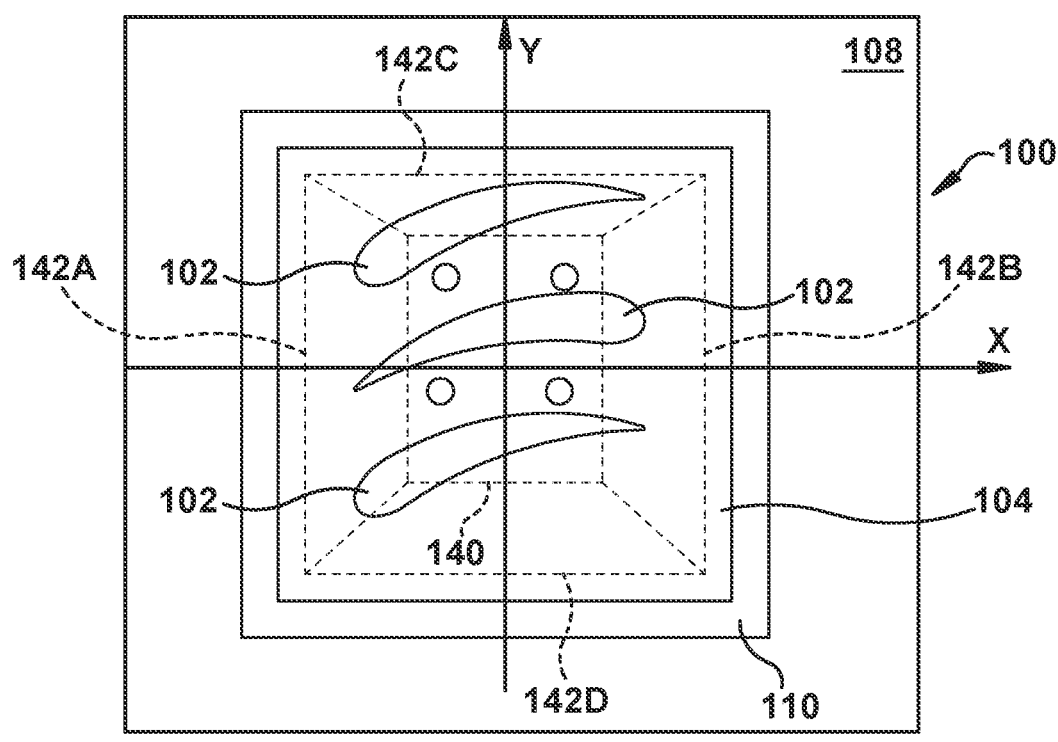
FIG. 4 shows a plan view of an additive manufacturing (AM) system including a partially flexible build platform, according to other embodiments of the disclosure.
FIG. 5 shows a plan view of an AM system including a partially flexible build platform, according to more embodiments of the disclosure.

As shown in the plan views of FIGS. 4 and 5, the location, shape, size and/or number of fixed region 140 and/or flex region 142 can vary in a wide variety of ways. In the FIG. 4 example, fixed region 140 is centered widthwise (W) and lengthwise (L) on build platform 104 with one surrounding flex region 142. Here, flex region 142 includes first opposing peripheral sides 142A, 142B positioned across a Y-axis of build platform 104, and second opposing peripheral sides 142C, 142D positioned across an X axis of build platform 104. In the FIG. 5 example, fixed region 140 extends diagonally on build platform 104 with flex region 142 having two triangular flex sides 142E, 142F on either side of fixed region 140. While particular examples of fixed region (s) 140 and flex region(s) 142 arrangements have been provided, it is emphasized that a wide variety of arrangements are possible.

Figure 6:
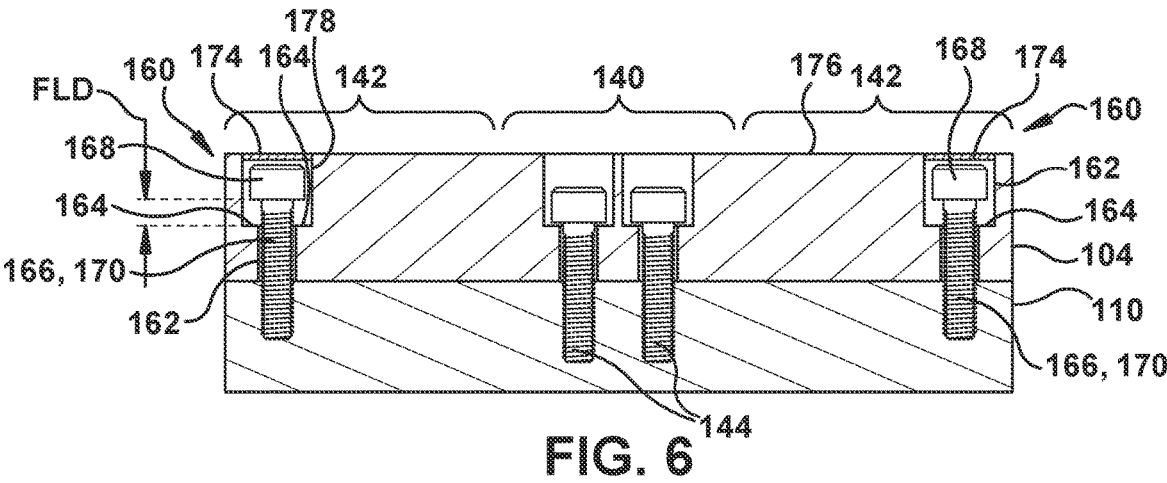
FIG. 6 shows a cross-sectional view of an AM system including a partially flexible build platform and a flex limiter in a non-flexed state, according to embodiments of the disclosure.
Figure 7:
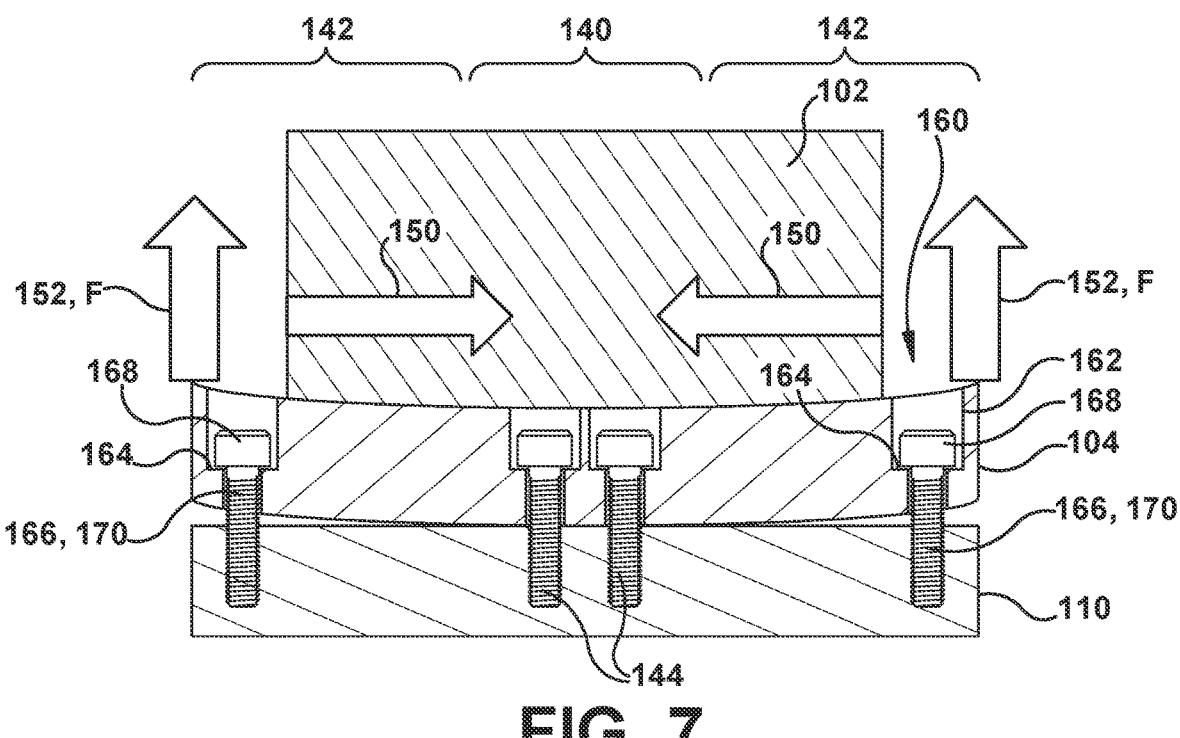
FIG. 7 shows a cross-sectional view of an AM system including the partially flexible build platform and the flex limiter in a flexed state, according to embodiments of the disclosure.

In the FIGS. 1-5 embodiments, flex region(s) 142 are allowed to flex to any extent. In certain situations, it may be desirable to limit the amount of flex of build platform 104. FIGS. 6 and 7 show simplified cross-sectional views of build platform 104 and base 110 of an AM system 100 including a flex limiter 160. Flex limiter 160 limits a range of flexing of flex region(s) 142 of build platform 104 relative to base 110. In accordance to certain embodiments of the disclosure, flex limiter 160 is within build platform 104. That is, it is contained within build platform 104 so that it does not have to be exposed to the build environment, which can expose it to build material 122 (e.g., metal powder) that can clog or damage the flex limiter.

FIGS. 6 and 7 show one embodiment of flex limiter 160 including an opening 162 defined through build platform 104 and including a seat 164 therein. Flex limiter 160 also includes a member 166 coupled to base 110 through opening 162. Member 166 includes a mechanical stop 168 spaced a distance FLD from seat 164 in a non-flexed state of build platform 104, i.e., at rest or with insufficient force F (FIG. 7) to flex build platform 104. Member 166 may include, for example, a bolt 170 threaded into base 110. However, member 166 may take a variety of other forms such as but not limited to a bolt welded to base 110. Mechanical stop 168 may be a head of member 166, e.g., a bolt head, but may include any structure capable of stopping movement of build platform 104 relative to base 110 at a desired location. As illustrated in FIG. 7, in response to sufficient force F being applied to build platform 104 by object(s) 102, flex region(s) 142 flexes relative to base 110 up to distance FLD at which mechanical stop 168 engages seat 164 to prevent further flexing. Distance FLD can be sized to allow any desired amount of flexing. Where adjustable member(s) 166, such as bolt 170, are used, the distance FLD can be adjusted to provide different levels of flex limiting to address different situations and different build platforms 104. While two flex limiters 160 are shown, any number may be used. Flex limiter(s) 160 may be located at any desired location in which limiting the flex of build platform 104 is desired. While shown as all identical in FIGS. 6 and 7, different flex limiters 160 across build platform 104 may allow different ranges of flexing of flex region(s) 142 of build platform 104 relative to base 110 at different locations across build platform 104.

Referring to FIG. 6, in some cases, opening 162 may be defined only in a build surface 176 of build platform 104 adjacent an area of build surface 165 upon which object(s) 102 will be built. Here, it may be advantageous to protect flex limiter 160 from exposure to the build environment where, for example, build material 122 (FIG. 1) may damage flex limiter 160. To this end, AM system 100 may optionally include a closure(s) 174 for opening(s) 168. Closure(s) 174 may take any form of at least one cap, seal, etc., capable of mounting in an upper end 178 of opening 162.

Figure 8:
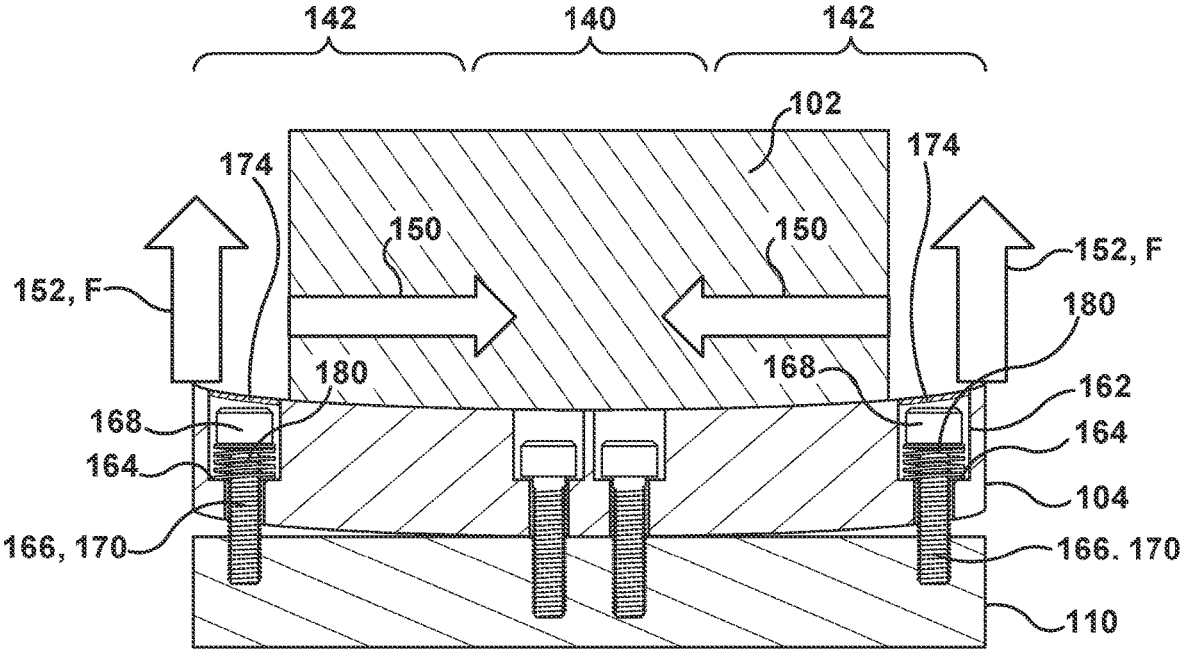
FIG. 8 shows a cross-sectional view of an AM system including a partially flexible build platform and a flex limiter in a flexed state, according to other embodiments of the disclosure.

Referring to FIG. 8, in certain embodiments, flex limiter 160 may further include a compressible member 180 between mechanical stop 168 of member 166 and seat 164 in build platform 104. Compressible member(s) 180 is/are housed within build platform 104, not above or below build platform 104. Further, compressible member 180 is not between build platform 104 and base 110, rather build platform 104 continues to directly contact base 110 in at least fixed region 104. Compressible member(s) 180 may include any now known or later developed compressible element capable of absorbing force between seat 164 and mechanical stop 168, and having sufficient corrosion-resistance. In one embodiment, compressible member 180 may include any form of compression spring (e.g., coil, stacked wave disk, etc.); however, it may include other forms of compressible members such as but not limited to: polymeric or rubber elements.

Embodiments of the disclosure may also include a method of additively manufacturing an object by an AM system 100, as described herein.

Figure 9:
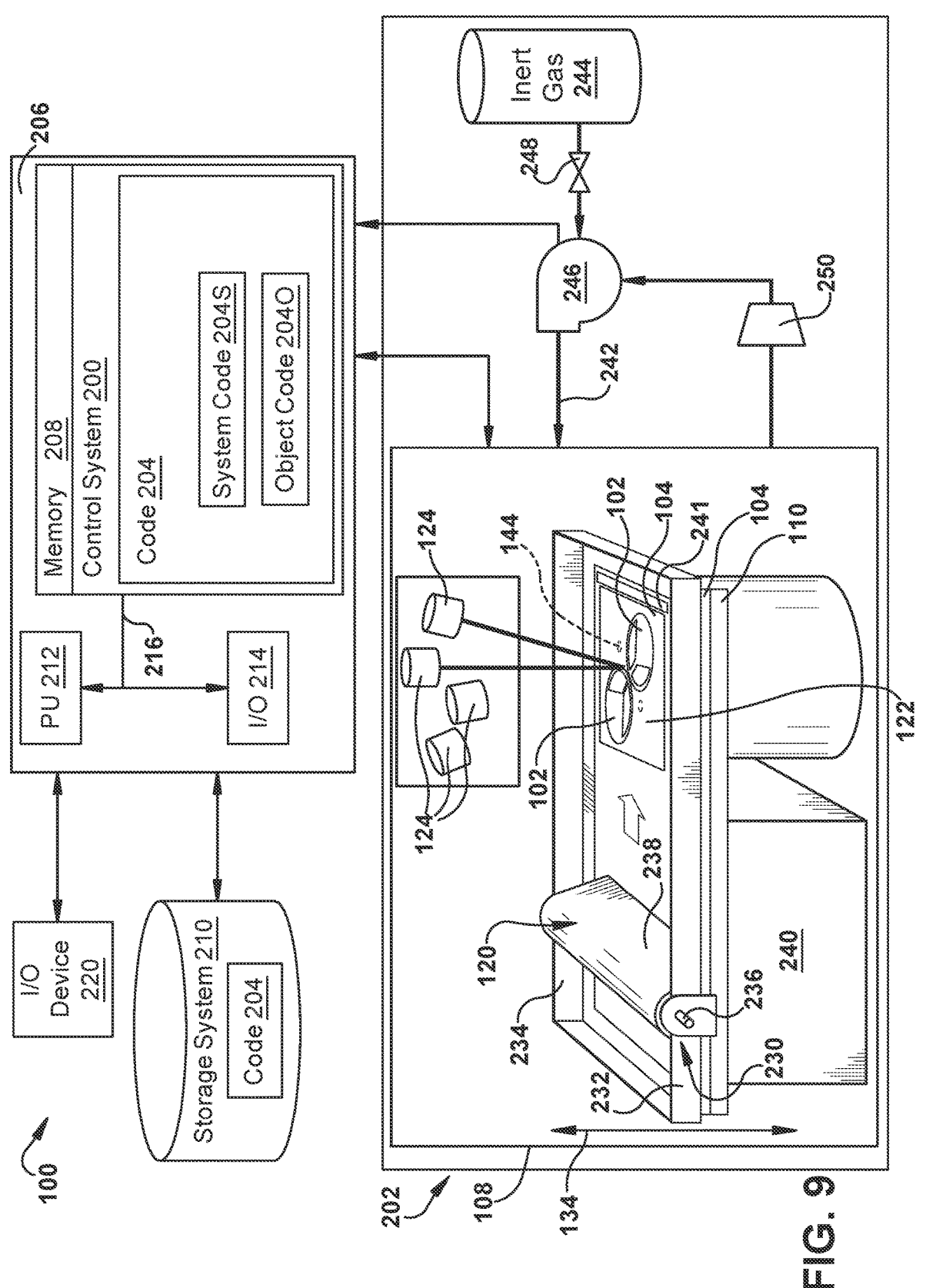
FIG. 9 shows a block diagram of an AM system and method, according to embodiments of the disclosure.

FIG. 9 shows a schematic block diagram of an example AM system 100. AM system 100 in FIG. 9 generally includes a metal powder additive manufacturing control system 200 ("control system") and an AM printer 202. Control system 200 executes object code 204O to generate object(s) 102 using one or more melting beam sources, e.g., lasers 124. However, the teachings of the disclosure are applicable to any melting beam source, e.g., an electron beam, laser, etc. Control system 200 is shown implemented on a computer 206 as computer program code. To this extent, computer 206 is shown including a memory 208 and/or a storage system 210, a processor unit (PU) 212, an input/output (I/O) interface 214, and a bus 216. Further, computer 206 is shown in communication with an external I/O device/resource 220 and storage system 210. In general, processor unit (PU) 212 executes computer program code 204 that is stored in memory 208 and/or storage system 210. While executing computer program code 204, processor unit (PU) 212 can read and/or write data to/from memory 208, storage system 210, I/O device 220 and/or AM printer 202. Bus 216 provides a communication link between each of the objects in computer 206, and I/O device 220 can comprise any device that enables a user to interact with computer 206 (e.g., keyboard, pointing device, display, etc.). Computer 206 is only representative of various possible combinations of hardware and software. For example, processor unit (PU) 212 may comprise a single processing unit, or be distributed across one or more processing units in one or more locations, e.g., on a client and server. Similarly, memory 208 and/or storage system 210 may reside at one or more physical locations. Memory 208 and/or storage system 210 can comprise any combination of various types of non-transitory computer readable storage medium including magnetic media, optical media, random access memory (RAM), read only memory (ROM), etc. Computer 206 can comprise any type of computing device such as an industrial controller, a network server, a desktop computer, a laptop, a handheld device, etc.

As noted, AM system 100 and, in particular control system 200, executes program code 204 to generate object (s) 102. Program code 204 can include, among other things, a set of computer-executable instructions (herein referred to as 'system code 204S') for operating AM printer 202 or other system parts, and a set of computer-executable instructions (herein referred to as 'object code 204O') defining object(s) 102 to be physically generated by AM printer 202. As described herein, the additive manufacturing methods begin with a non-transitory computer readable storage medium (e.g., memory 208, storage system 210, etc.) storing program code 204. System code 204S for operating AM printer 202 may include any now known or later developed software code capable of operating AM printer 202.

Object code 204O defining object(s) 102 may include a precisely defined 3D model of an object and can be generated from any of a large variety of well-known computer aided design (CAD) software systems such as AutoCAD®, TurboCAD®, DesignCAD 3D Max, etc. In this regard, object code 204O can include any now known or later developed file format. Furthermore, object code 204O representative of object(s) 102 may be translated between different formats. For example, object code 204O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Object code 204O representative of object(s) 102 may also be converted into a set of data signals and transmitted, received as a set of data signals and converted to code, stored, etc., as necessary. In any event, object code 204O may be an input to AM system 100 and may come from a part designer, an intellectual property (IP) provider, a design company, the operator or owner of AM system 100, or from other sources. In any event, control system 200 executes system code 204S and object code 204O, dividing object(s) 102 into a series of thin slices that assembles using AM printer 202 in successive layers of material.

One or more melting beam sources, e.g., lasers 124, are configured to melt layers of metal powder on build platform 104 to generate object(s) 102.

Continuing with FIG. 9, applicator 120 may create a thin layer of raw material 122 spread out as the blank canvas from which each successive slice of the final object will be created. Applicator 120 may move under control of a linear transport system 230. Linear transport system 230 may include any now known or later developed arrangement for moving applicator 120. In one embodiment, linear transport system 230 may include a pair of opposing rails 232, 234 extending on opposing sides of build platform 104, and a linear actuator 236 such as an electric motor coupled to applicator 120 for moving it along rails 232, 234. Linear actuator 236 is controlled by control system 200 to move applicator 120. Other forms of linear transport systems may also be employed. Applicator 120 take a variety of forms. In one embodiment, applicator 120 may include a body 238 configured to move along opposing rails 232, 234, and an actuator element (not shown in FIG. 9) in the form of a tip, blade or brush configured to spread metal powder evenly over build platform 104, i.e., build platform 104 or a previously formed layer of object(s) 102, to create a layer of raw material. The actuator element may be coupled to body 238 using a holder (not shown) in any number of ways. The process may use different raw materials in the form of metal powder. Raw materials may be provided to applicator 120 in a number of ways. In one embodiment, shown in FIG. 9, a stock of raw material may be held in a raw material source 240 in the form of a chamber accessible by applicator 120. In other arrangements, raw material 122 may be delivered through applicator 120, e.g., through body 238 in front of its applicator element and over build platform 104. In any event, an overflow chamber 241 may be provided on a far side of applicator 120 to capture any overflow of raw material not layered on build platform 104.

In one embodiment, object(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$).

The atmosphere within build chamber 108 is controlled for the particular type of melting beam source being used. For example, for lasers 124, build chamber 108 may be filled with an inert gas such as argon or nitrogen and controlled to minimize or eliminate oxygen. Here, control system 200 is configured to control a flow of an inert gas mixture 242 within build chamber 108 from a source of inert gas 244. In this case, control system 200 may control a pump 246, and/or a flow valve system 248 for inert gas to control the content of gas mixture 242. Flow valve system 248 may include one or more computer controllable valves, flow sensors, temperature sensors, pressure sensors, etc., capable of precisely controlling flow of the particular gas. Pump 246 may be provided with or without valve system 248. Where pump 246 is omitted, inert gas may simply enter a conduit or manifold prior to introduction to build chamber 108. Source of inert gas 244 may take the form of any conventional source for the material contained therein, e.g. a tank, reservoir or other source. Any sensors (not shown) required to measure gas mixture 242 may be provided. Gas mixture 242 may be filtered using a filter 250 in a conventional manner. Alternatively, for electron beams, build chamber 108 may be controlled to maintain a vacuum. Here, control system 200 may control a pump 246 to maintain the vacuum, and flow valve system 248, source of inert gas 244 and/or filter 250 may be omitted. Any sensors (not shown) necessary to maintain the vacuum may be employed.

Vertical adjustment system 134 may be provided to vertically adjust a position of various parts of AM printer 202 to accommodate the addition of each new layer, e.g., a build platform 104 may lower and/or chamber 108 and/or applicator 120 may rise after each layer. Vertical adjustment system 134 may include any now known or later developed linear actuators to provide such adjustment that are under the control of control system 200.

In operation, build platform 104 with metal powder thereon is provided within build chamber 108, and control system 200 controls the atmosphere within build chamber 108. Control system 200 also controls AM printer 202, and in particular, applicator 120 (e.g., linear actuator 236) and melting beam source(s) (e.g., laser(s) 124) to sequentially melt layers of metal powder on build platform 104 to generate object(s) 102 according to embodiments of the disclosure. As noted, various parts of AM printer 202 may vertically move via vertical adjustment system 134 to accommodate the addition of each new layer, e.g., a build platform 104 may lower, and/or chamber 108 and/or applicator 120 may rise after each layer. Where object(s) 102 exert sufficient force F (FIGS. 3, 7, 8), flex region(s) 142 of build platform 104 flex upwardly to relieve stress in object (s) 102 and/or build platform 104. Meanwhile, fixed region 140 remains fixedly coupled and in direct contact with base 110. While a particular AM system has been described herein, it is emphasized that the teachings of the disclosure are applicable to a wide variety of additive manufacturing processes other than DMLM.

Embodiments of AM system 100 allow development of large additive objects that have high thermal stress during the print process and may normally crack by reducing the stress therein, thus improving produce-ability and/or part yield. The system also allows production of larger additively manufactured objects, perhaps with more crack prone material. Any flex limiter provided is located in a protected manner within the build platform, i.e., not above or below the build platform, or between the build platform and the base.

The foregoing drawings show some of the processing associated according to several embodiments of this disclosure. The acts noted in the drawings or description may occur out of the order noted or, for example, may in fact be executed substantially concurrently or in the reverse order, depending upon the act involved. Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−5% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An additive manufacturing (AM) system, comprising:
a build chamber;
a base adjustably coupled to the build chamber;
a build platform having a length and a width and including
a fixed region disposed centrally with respect to at least one of the length and the width, wherein the fixed region is fixedly and rigidly coupled to the base in direct contact therewith by at least one fastener disposed in the fixed region, the build platform further including a flex region configured to flex relative to the base in response to a force applied to the build platform by an object;
a flex limiter within the build platform, the flex limiter limiting a range of flexing of the flex region of the build platform relative to the base, wherein the flex limiter includes:
an opening defined through the build platform in the flex region, the opening including a seat therein;
a member coupled to the base through the opening, the member including a mechanical stop spaced a predefined distance from the seat in a non-flexed state of the build platform; and
wherein in response to the force applied to the build platform by the object, the flex region flexes relative to the base until the mechanical stop prevents further flexing, the seat thereby having traveled no more than the predefined distance; and
a build material applicator for depositing a build material above the build platform for creating the object.

2. The AM system of claim 1, further comprising a compressible member between the mechanical stop of the member and the seat in the build platform, the compressible member engaging a bottom surface of the mechanical stop and a top surface of the seat.

3. The AM system of claim 2, wherein the compressible member includes a compression spring.

4. The AM system of claim 1, wherein the opening is defined only in a build surface of the build platform adjacent an area of the build surface upon which the object will be built, and further comprising a closure mounted in an upper end of the opening and enclosing the flex limiter.

5. The AM system of claim 1, wherein the flex region includes first opposing peripheral sides across an X axis of the build platform.

6. The AM system of claim 5, wherein the flex region includes second opposing peripheral sides across a Y axis of the build platform.

7. The AM system of claim 1, wherein the build material applicator deposits a layer of material, and further comprising a welding system for welding a portion of the layer of material to an underlying layer of the object.

8. An additive manufacturing (AM) system, comprising:

a build chamber;

a base adjustably coupled to the build chamber;

a build platform including a fixed region, wherein the fixed region is centrally disposed in and extends along substantially an entire dimension of the build platform, the fixed region is fixedly and rigidly coupled to the base in direct contact therewith by at least one fastener disposed in the fixed region, the build platform also includes a flex region adjacent a long edge of the fixed region and an edge of the build platform, and wherein the flex region is configured to flex relative to the base in response to a force applied to the build platform by an object;

a flex limiter within the build platform and disposed in the flex region, the flex limiter limiting a range of flexing of the flex region of the build platform relative to the base, wherein the flex limiter includes:

an opening defined through the build platform in the flex region, the opening including a seat therein;

a member coupled to the base through the opening, the member including a mechanical stop spaced a distance from the seat in a non-flexed state of the build platform; and wherein in response to the force applied to the build platform by the object, the flex region flexes relative to the base until the mechanical stop prevents further flexing; and a build material applicator for depositing a build material above the build platform for creating the object.

9. The AM system of claim 8, further comprising a compressible member between the mechanical stop of the member and the seat in the build platform, the compressible member engaging a bottom surface of the mechanical stop and a top surface of the seat.

10. The AM system of claim 9, wherein the compressible member includes a compression spring.

11. The AM system of claim 8, wherein the opening is defined only in a build surface of the build platform adjacent an area of the build surface upon which the object will be built, and further comprising a closure mounted in an upper end of the opening.

12. The AM system of claim 8, wherein the flex region includes first opposing peripheral sides across an X axis of the build platform.

13. The AM system of claim 12, wherein the flex region includes second opposing peripheral sides across a Y axis of the build platform.

14. The AM system of claim 8, wherein the build material applicator deposits a layer of material, and further comprising a welding system for welding a portion of the layer of material to an underlying layer of the object.

15. The AM system of claim 8, wherein the fixed region extends parallel to an edge of the build platform and the flex region is rectangular.

16. The AM system of claim 8, wherein the fixed region extends diagonally across the build platform and the flex region is triangular.

17. The AM system of claim 8, wherein the flex region is a first flex region, the AM system further comprising a second flex region adjacent an opposite long edge of the fixed region.

18. A method comprising:

additively manufacturing an object by an additive manufacturing (AM) system including:

a build chamber;

a base adjustably coupled to the build chamber;

a build platform including a fixed region, wherein the fixed region is in direct contact with the base, the fixed region is fixedly and rigidly coupled to the base by at least one fastener disposed in the fixed region, and the build platform also includes a flex region configured to flex relative to the base in response to a force applied to the build platform by an object;

a flex limiter within the build platform and disposed in the flex region, the flex limiter limiting a range of flexing of the flex region of the build platform relative to the base, wherein the flex limiter includes:

an opening defined through the build platform in the flex region, the opening including a seat therein;

a member coupled to the base through the opening, the member including a mechanical stop spaced a predefined distance from the seat to a bottom surface of the mechanical stop in a non-flexed state of the build platform; and a compressible member between the mechanical stop of the member and the seat in the build platform, wherein in response to the force applied to the build platform by the object, the flex region flexes relative to the base until the mechanical stop prevents further flexing, the seat thereby having traveled no more than the predefined distance; and a build material applicator for depositing a build material above the build platform for creating the object.

* * * * *